United States Patent [19]

Yang et al.

[11] 4,191,115
[45] Mar. 4, 1980

[54] CARBONACEOUS FUEL COMBUSTION WITH IMPROVED DESULFURIZATION

[75] Inventors: Ralph T. Yang, Middle Island; Ming-shing Shen, Rocky Point, both of N.Y.

[73] Assignee: The United States of America as represented by the United States Department of Energy, Washington, D.C.

[21] Appl. No.: 918,618

[22] Filed: Jun. 23, 1978

[51] Int. Cl.² ............................................. F23B 7/00
[52] U.S. Cl. ................................... 110/347; 110/218; 110/345; 122/4 D; 423/244
[58] Field of Search ............... 110/347, 345, 344, 343, 110/218; 122/4 D; 423/244 R, 244 A, 555, ; 48/197 R

[56] References Cited

U.S. PATENT DOCUMENTS

| | | | |
|---|---|---|---|
| 3,540,387 | 11/1970 | McLareh et al. | 110/345 |
| 3,717,700 | 2/1973 | Robison et al. | 110/345 X |
| 3,966,431 | 6/1976 | Craig | 122/4 D X |
| 4,008,169 | 2/1977 | McGauley | 423/244 R |
| 4,084,545 | 4/1978 | Mack et al. | 110/347 X |
| 4,103,646 | 8/1978 | Yerushaimi et al. | 122/4 D |

Primary Examiner—Edward G. Favors
Attorney, Agent, or Firm—Lupo R. V.; Leonard Belkin; Cornell D. Cornish

[57] ABSTRACT

Lime utilization for sulfurous oxides adsorption in fluidized combustion of carbonaceous fuels is improved by impregnation of porous lime particulates with iron oxide. The impregnation is achieved by spraying an aqueous solution of mixed iron sulfate and sulfite on the limestone before transfer to the fluidized bed combustor, whereby the iron compounds react with the limestone substrate to form iron oxide at the limestone surface. The iron oxide present in the spent limestone is found to catalyze the regeneration rate of the spent limestone in a reducing environment. Thus both the calcium and iron components may be recycled.

39 Claims, 2 Drawing Figures

CARBONACEOUS FUEL COMBUSTION WITH IMPROVED DESULFURIZATION This invention was made under, or during, the course of, a contract with the United States Department of Energy.

FIELD OF THE INVENTION

This present invention relates to the combustion of carbonaceous fuels bearing sulfur. Specifically the invention relates to the removal of sulfurous oxides as combustion products in the combustion of solid carbonaceous fuels in a fluidized bed combustion, and to the recycling of the reaction materials.

BACKGROUND OF THE INVENTION AND DISCUSSION OF THE PRIOR ART

Most carbonaceous and hydrocarbonaceous fuels contain sulfur and a major cause of air pollution is by the sulfur dioxide emanating from the fuels when burned in industrial installations.

One approach was to attempt to remove sulfur from the fuel, such as coal, prior to combustion. Pelcarski et al., U.S. Pat. No. 3,033,739, granted Oct. 13, 1970, sought to remove the sulfur by employing molten iron with lime as a flux; and Sass et al., U.S. Pat. No. 3,736,233, granted May 29, 1973, desulfurized the coal by employing iron oxide.

Recently fluidized bed combustion has been considered as an approach for the clean combustion of sulfur bearing coal. One aspect of the approach is flue gas desulfurization. Amongst processes which have been described for this purpose are the direct injection of dry lime/dolomite or of wet lime, or of lime slurry, into the combustion process. In the lime slurry process the solid waste causes a disposal problem and the process costs are high, whilst in the dry lime method only a fraction of the material has proved to be very reactive and once this fraction has reacted the balance reacted very slowly.

Also limiting to the widespread use of fluidized bed combustion is the economics of the use of lime as determined by the Ca/S ratio, or otherwise stated, the lime requirement. The Ca/S ratio is usually at least 2.5, and it has been considered desirous to reduce this ratio in order to provide a more economically viable process.

In one approach Moss, U.S. Pat. No. 3,807,090, granted Apr. 30, 1974, sought to burn sulfur bearing fuels in a bed of CaO and/or by MgO, and further provided iron to remove certain metals from the fuel undergoing combustion.

Now there has been provided by the present invention a method for clean combustion of sulfur-bearing carbonaceous fuel in a fluidized bed combustion wherein the lime requirement is reduced with improved absorption of the sulfurous oxides by the lime.

It is therefore an object of this invention to provide a method and composition for the absorption of sulfurous gases.

It is therefore an object of this invention to provide a method and composition for the improved absorption of sulfurous oxides in the combustion of carbonaceous fuels.

It is another aspect of this invention to provide a limestone composition for the improved removal of sulfurous oxides in fluidized bed combustion of carbonaceous fuels.

It is another aspect of this invention to provide a method for fluidized bed combustion as aforesaid, wherein the novel composition contributing to the improved removal of sulfurous oxides is recycled so as to reuse in the fluidized bed combustion.

It is still another aspect of this invention to provide a method for preparing limestone so as to improve its sulfurous oxide removal properties in the fluidized bed combustion of carbonaceous fuels.

It is another object of the invention to provide a method and composition as immediately aforesaid to permit the ready recycling of the active components to the fluidized bed combustion.

It is still another object of this invention to provide a method and composition to reduce the sulfurous pollutants emanating from the combustion of carbonaceous fuels.

It is still a further object of this invention to provide a method and composition as aforesaid which employ readily available materials and which is practical in operation.

The aforesaid as well as other objects and advantages of the present invention will become apparent from a reading of the following specification, the adjoined claims, and the drawings in which:

DISCUSSION OF THE PREFERRED EMBODIMENTS

Broadly speaking the present invention comprises a composition and process for removing sulfurous gases wherein a metal oxide coated limestone exhibits improved desulfurization properties over an uncoated limestone. In another aspect this invention comprises a method of forming and the recognition of a metal oxide coated limestone and its use in a fluidized combustion chamber for the removal of sulfurous oxides emanating from the combustion of sulfur-bearing coal. In still another aspect of the invention is the recognition that the iron oxide present in a coal ash is useful to be recycled and combined with limestone utilization in the removal of sulfurous oxides emanating from the combustion of sulfur-bearing coal.

Figure 1:
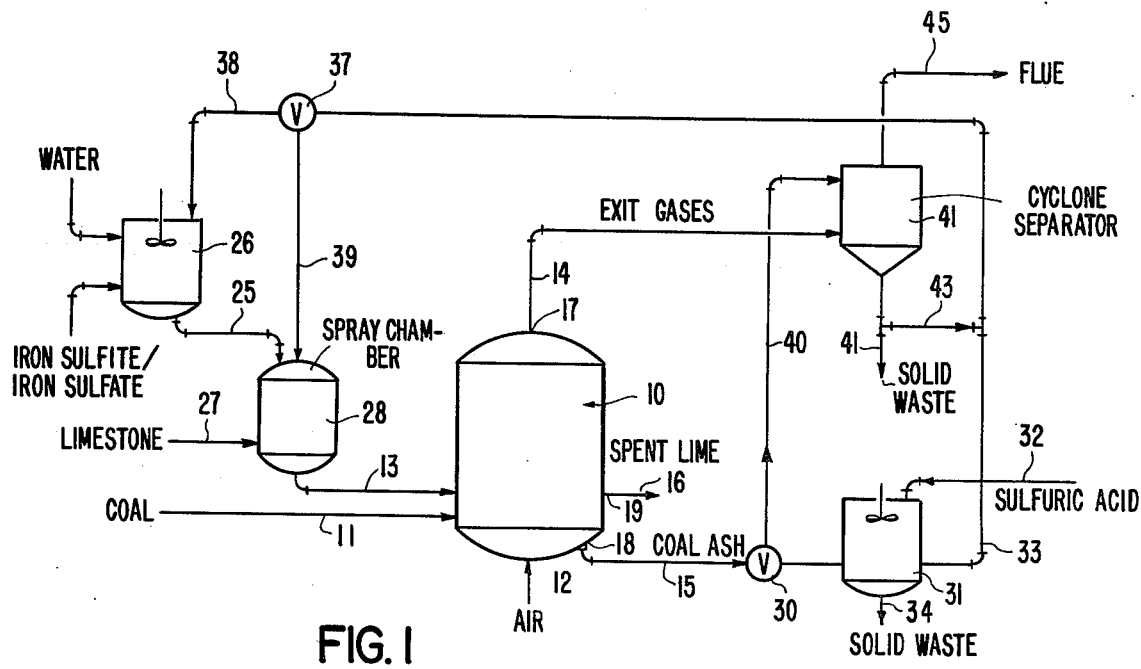
FIG. 1 is a schematic flow sheet of the present invention.

Referring to FIG. 1, there is shown a fluidized bed combustion chamber 10 of generally conventional design. In such combustion operation, coal 11 is burned in the presence of a stream of air 12 in the presence of a bed of limestone particulates 13, the composition of which will be more fully discussed hereinafter. Exit gases 14 leave the combustion chamber 10 at 17, and the coal ash 15 is removed at 18 while the spent limestone 16 is removed at 19.

Figure 2:
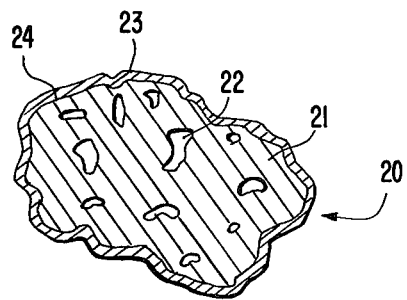
FIG. 2 is a greatly enlarged sectional view of a particle comprising the composition of the present invention.

Referring now specifically to FIG. 2, there is shown a particle of the limestone composition as formed in and used to remove sulfurous oxides in the fluidized bed combustion chamber 10, and said particle is generally designated as 20. Particle 20 comprises a base or substrate of calcined limestone 21 being formed with pores 22. A coating of iron oxide 23 integrally adheres to the outside of limestone 21 as at 24. None of the iron oxide is generally formed within the pores 22, and it is believed that air or gas pockets prevent this internal formation. Without wishing to be bound by any theory or mechanism it appears that these particulates 20 through the catalytic activity of the iron oxide in combination with the limestone, provide an improved absorption of the sulfurous oxides emanating from the burning coal.

Referring again to FIG. 1 the particulates 20 are formed by first preparing an iron sulfite/sulfate solution 25 of high concentration of about 3 molar, in a mixing vessel 26. A more dilute concentration may be used if desired by the high concentration is preferred. The iron sulfate/sulfite solution is then sprayed on a limestone 27 in a spray chamber 28, to form the limestone feed 13. The limestone 27 may be precalcined or will be subsequently calcined in combustion chamber 10.

Coal ash 15 contains approximately 10 to 20 percent Fe as $Fe_2O_3$ and it is with the contemplation of this invention to recover and recycle the $Fe_2O_3$ for further limestone treatment. In a material balance of combustor 10, we find that with a coal having 3 percent sulfur, the coal requires a 10:2 weight ratio of coal to limestone, or 10:1.1 on a CaO basis. After combustion approximately 10 percent of the coal remains as ash. We thus have 1 pound of ash for every 10 pounds of coal. Further, 1 pound of coal ash will contain up to about 0.2 pounds of $Fe_2O_3$ or approximately 20 percent of the CaO requirement. Then if all the $Fe_2O_3$ is recovered there would be an abundance of ash-source $Fe_2O_3$ for limestone treatment, insofar as only up to about 10 percent $Fe_2O_3$ (by weight of CaO) would be required, and usually significantly less.

Coal ash 15 passes through valve 30 to mixing vessel 31, wherein the ash is treated with sulfuric acid 32 to form iron sulfate/sulfite 33 which is returned to mixing vessel 26 through valve 37 and line 38 for additional make-up iron sulfate/sulfite to the extent and concentration as required for subsequent spraying in chamber 28. Alternatively the recycled iron sulfate/sulfite 33 may be directly used in spray chamber 28 as at 39. If dilute iron sulfate/sulfite solutions are sprayed on the limestone it is contemplated that multiple spraying may be advantageous. The acid treated coal ash in vessel 31 leaves a residue of principally carbon which is filtered off as solid waste 34.

The coal ash 15 may also be passed through valve 30 and line 40 to premix in the cyclone separator 41, where exit gases 14, if they contain sulfur dioxide, are first mixed with the ash containing $Fe_2O_3$ to effect a formation of iron sulfate/sulfite which is then passed by gravity downward through cyclone separator 41 to line 43 to combine with the flow of line 33. Solid waste is removed at 44 and sulfur free gases exit at 45.

While the aforesaid described preferred embodiment refers to iron sulfate/iron sulfite it is within the broad contemplation of this invention to employ any metal salt which will decompose under high temperatures present in carbonaceous fuel combustion to provide a metal residue on the limestone. By the term "metal" as used hereinbefore and hereinafter throughout the specification and claims it is meant any metal, including mixed metals or complex metals forming complex metal salts; also particularly the transition metals, and preferrably the Group VIII metals, Co, Fe, and Ni. Most preferred is Fe in view of its low cost and abundance in the coal ash. By the term "salt" as used hereinbefore and hereinafter throughout the specification and claims, it is meant any group which will combine with the "metal" as aforesaid and undergo decomposition, including by way of example, $SO_3$, $SO_4$, $CO_3$, oxalate, acetate, formate and the like. Other groups such as nitrates are in theory useful but in practice provide noxious nitrous gases upon decomposition, and therefore of obvious questionable use.

The metal salts of this invention may be applied in the limestone by any suitable operation known to one skilled in the art. The metal salt may be dissolved in a solvent and sprayed directly onto the limestone, or the limestone may be dipped or soaked in the salt solution. Further the metal salt or the metal oxide may directly integrally adhere to the limestone surface by sintering or fluxing or other known fusing techniques. It is also within the contemplation of this invention to mix the metal oxide and the limestone for dry coating but this is not preferred coating technique.

The most preferred metal is iron and most preferred salt is iron sulfate and/or iron sulfite, which readily decomposes to iron oxide. It has been found that 0.25 to about 10.0 weight percent of iron oxide of the limestone (based on CaO) is useful pursuant to the present invention and the preferred range is 0.5 to 3.0 weight percent. It is, of course, understood where other metal oxides are used the weight percentages would be commensurately different in proportion to the molecular weights compared to that of iron oxide. It is also found that the iron sulfate/iron sulfite is present in an amount approximating 0.50 to 10.0 weight percent of the limestone (based in CaO).

EXPERIMENTAL EXAMPLE I

Greer limestone having the following chemical analysis was used in this example:

|  | Percent by weight |
|---|---|
| $CaCO_3$ | 80.4 |
| $MgCO_3$ | 3.5 |
| $SiO_2$ | 10.3 |
| $Al_2O_3$ | 3.2 |
| $Fe_2O_3$ | 1.2 |
| $Na_2O$ | 0.23 |
| $H_2O$ | 1.17 |
| Particle range: $-16 + 20$ Tyler screen mesh. | |

The Greer limestone is the calcined form and has a pore structure following a uni-modal size distribution with the majority of the pores having a diameter in the range of 0.2 to 0.4 microns. All other solid materials used in this example were of reagent grade. The gases used in this example were supplied by Matheson Company as custom-made, pre-mixed $SO_2$ in $N_2$, at the various specified concentrations.

The lime samples were dipped (soaked) in concentrated $Fe_2(SO_4)_3$ aqueous solution of about 3 molar concentration at room temperature for 2–5 minutes. Both uncalcined limestone are precalcined limestone (i.e. calcined at 900° C. in $N_2$) were treated with $Fe_2(SO_4)_3$ in the aforesaid manner.

The treated samples were air-dried, and then rapidly heated at 25° C./minute in $N_2$ to $N_2$ to 900° C. Distinct stages in weight loss were noted as follows: moisture loss below 200° C.; thermal decomposition of ferric sulfate below 600° C.; and calcanation of the carbonate alone 700° C.

The amount of $Fe_2O_3$ deposited on the lime surface was calculated from the weight loss due to the reaction:

$$Fe_2(SO_4)_3 \rightarrow Fe_2O_3 + 3SO_3.$$

The iron content was also checked with the results of atomic absorption analyses and the above method was confirmed as accurate, as reported in Table I.

$SO_2$ reactivity measurements were commenced when the temperature reached 900° C., and when the calcination was complete for the experiments involving the uncalcined stone. For reactivity measurements, the reacting gas had the following composition: 0.25 percent $SO_2$, 5 percent $O_2$, 5 percent $H_2O$ and balance $N_2$. Reactivity measurements were conducted using a DuPont thermo-analyzer Model 951, and a small quartz boat with an area of about 0.6 $cm^2$ was used as the sample holder (a platinum boat was not used to avoid possible catalytic effects). A quartz tube packed with alumina chips and housed in a tubular furnace served as the pre-heater for the reactant gases. Steam in the reactant gases was generated by bubbling the inert carrier gas ($N_2$) through a temperature-controlled water bath prior to entering the pre-heater. The bubbler as jacketed and water was circulated in the jacket from a constant temperature water bath.

In a typical experiment, about 40 mg of lime sample was spread into a thin layer on the holder as the solid reactant. The pre-heated gas mixture flowed over the sample surface at a velocity of about 10 cm/sec. The velocity was pre-determined to be high enough to minimize the role played by the gas film diffusion, or the overall rate did not increase with further increase in the velocity.

The fluidized-bed sulfator, which was also used to measure the sulfation rate, was a 3-cm diameter quartz unit. Details of the reactor have been given elsewhere. The pretreated samples, which has been subjected to the aforementioned treatment, were dropped into the pre-heated reactor with pre-heated sulfating gas mixture flowing through it. The $SO_3$ content in the sample was measured after certain periods of reaction time. The Dupont analyzer data are shown in Table 1 below.

TABLE 1

Catalytic effect of the reactivity of lime for sulfation

| Time, min. | Percent CaO sulfated* in sample** | | | | |
|---|---|---|---|---|---|
|  | A | B | C | D | E |
| 10 | 10.1 | 14.3 | 11.8 | 10.3 | 10.2 |
| 30 | 23.7 | 37.4 | 31.9 | 26.6 | 28.0 |
| 60 | 32.7 | 60.2 | 49.7 | 39.0 | 43.6 |
| 90 | 36.9 | 72.3 | 56.8 | 43.4 | 49.5 |
| 120 | 37.7 | 77.7 | 60.03 | 45.5 | 52.3 |
| 150 | 38.4 | 80.7 | 62.7 | 46.8 | 53.8 |
| 180 | 39.9 | 82.5 | 64.4 | 47.9 | 54.9 |

*Sulfation conditions: 900° C. and 1 atm. with 0.25% $SO_2$, 5% $O_2$, 5% $H_2$) and balance $N_2$. Sample size = −16 + 20 Tyler mesh.
**A: Greer limestone pre-calcined at 900° C. in $N_2$. (Note: the limestone contains .8% $Fe_2O_3$ inherently distributed throughout the particles).
B: Pre-calcined lime coated or deposited with 1.35% $Fe_2O_3$ (based on CaO)
C: Uncalcined limestone coated with 1.42% $Fe_2O_3$ (based on CaO)
D: Pre-calcined lime physically mixed with 1% $Fe_2O_3$ particles (size −200 + 325 mesh).
E: Pre-calcined lime mixed with 1.37% NaCl.

It is thus observed that the iron oxide not only catalyzed the sulfation rate but also increased the capacity for $SO_2$ absorption. This is evidenced by the fact that the results of Samples B and C did not plateau as readily as sample A.

EXPERIMENTAL EXAMPLE II

A fluidized-bed sulfator was employed in this example. A treated sample prepared as in Example I was employed, said example contained about 0.7 to 0.8 weight percent $Fe_2O_3$ (based on CaO) deposited on the uncalcined limestone. The total sulfur adsorption was increased by 30 weight percent in three hours of fluidized-bed sulfator operation as compared with a sample which was not dipped in the ferric sulfate solution.

EXPERIMENTAL EXAMPLE III

A similar sample of Greer limestone was vacuum impregnated with concentrated aqueous ferric sulfate to provide similar weight percentages of $Fe_2O_3$ but fully impregnated throughout the pore structures. No added effectiveness in $SO_2$ absorption was observed as compared with the $Fe_2O_3$ surface counted samples of Example 1.

EXPERIMENTAL EXAMPLE IV

Five samples of precalcined limestone were prepared as follows:

| Sample No. | Coating |
|---|---|
| 1 | uncoated |
| 2 | cobalt sulfate (heptahydrate) |
| 3 | nickel sulfate (heptahydrate) |
| 4 | ferric sulfate |
| 5 | ferrous sulfate (heptahydrate) |

The coating weight of coatings per unit weight CaO was approximately the same for each coating. The coated samples were-predecomposed before thermogravimetric analysis (TGA). The results of sulfur dioxide absorption indicate that sample No. 4 showed approximately twice the level of absorption compared to sample No. 1, while sample Nos. 2, 3 and 5 showed measurable improvement over the uncoated sample No. 1.

The Example demonstrates the usefulness of all Group VIII metal oxides pursuant to the present invention.

EXPERIMENTAL EXAMPLE V

A sulfated Greer limestone, as in Sample C of Table 1, was regenerated at 1000° C. in the thermogravimetric analyzer in the presence of carbon. The sulfated limestone and carbon were present in a stoichiometric ratio of $CaSO_2:\frac{1}{2}C$. An incremental increase of approximately 30% in the regeneration rate was obtained. The rate calculations were based on the total fractional regeneration of the sulfated sample after $\frac{1}{2}$ hour of reaction time, which approximates the conditions for large-scale process operation.

This example demonstrates the regenerative catalytic activity of iron oxide.

This present invention further recognizes that the presence of certain metal oxides will increase the regeneration rate of spent limestone 16 when the spent limestone is subjected to a reduction environment at elevated temperatures. By "regeneration" it is meant converting the calcium sulfate at the surface of the limestone particles to active lime. Such regenerated lime, still containing the catalytic metal oxide can generally be recycled directly to the fluidized bed combustor 10 without further treatment.

By the term "metal oxide" it is meant any metal oxide, but principally the Group VIII metal oxides, and most preferrably iron oxide. It has been found that iron oxide in amounts of from about 0.5 to 10 percent by weight of the limestone (CaO basis) increases the regeneration rate of the spent lime, and the rate of regeneration increases with the amount of iron oxide present. Regeneration rate increases of at least 10%, and usually 30 to 70% have been found. Often only 1 to 2% $Fe_2O_3$ is required to show significant rate improvements.

Suitable reductants in the regeneration include the well-recognized materials such as C, CO, $H_2$, $CH_4$ and the like, which are introduced in conventional high temerature apparatus, such as kilns, and both fluidized-bed and fixed-bed chambers. The temperature at which regeneration occurs, has been found to be from 950° C. to about 1150° C., although the temperature may be adjusted as determined by the skilled practitioner in the art.

As can readily be discerned this present invention reduces the Ca/S to ratio heretofore required in prior art sulfur removal processes and whereas the prior art required at least a 2.5 Ca/S ratio, the present Ca/S ratio would be substantially lower.

Heat is generated by the fluidized-bed combustion of the present invention and may be used for steam and power generation. Some of the heat of course may be utilized to produce the in situ reaction of the iron sulfite/sulfate to iron oxide on the limestone surface.

While a fluidized bed combustion system is described herein for purposes of disclosure, it will be apparent to those skilled in the art that the heat generated from the combustion of fuel by the present invention may be utilized in any application where hot products of combustion are utilized as reagents or as a heat and energy source, and where carbonaceous fuel is available. The present invention therefore is well adapted to carry out the objects and attain the ends and advantages mentioned as well as those inherent therein. While presently preferred embodiments of the invention are given for the purpose of disclosure numerous changes in the details of the process arrangement of steps can be made which will readily suggest themselves to those skilled in the art and which are encompassed within the spirit of the invention and the scope of the appended claims.

What we claim is:

1. A method for desulfurization in the combustion of sulfur-containing carbonaceous fuel comprising, burning said carbonaceous fuel in the presence of limestone, said limestone being coated with a metal oxide.

2. The method of claim 1, further comprising a first step of coating the limestone with a metal salt and decomposing the salt to form the metal oxide.

3. The method of claim 2, wherein the metal salt is in an aqueous solution during coating.

4. The method of claim 3, wherein the step of coating is by spraying.

5. The method of claim 1, wherein the metal oxide is present as 0.25 to 10 weight percent of the CaO.

6. The method of claim 5, wherein the metal oxide is present as 0.5 to 3.0 weight percent of the CaO.

7. The method of claim 1, wherein the burning is in a fluidized bed combustor.

8. The method of claim 1, wherein the fuel is coal and the metal is iron and further comprising reacting the residue coal ash containing iron with sulfuric acid to form the metal salt comprising at least one of iron sulfate and iron sulfite salt.

9. The method of claim 8, further comprising coating limestone with the iron sulfate/sulfite and reacting the iron sulfate/sulfite to form iron oxide on the limestone.

10. The method of claim 9, wherein the reaction occurs within a fluidized bed combustor.

11. The method of claim 1, said limestone being calcined.

12. The method of claim 1, said metal being a transition metal.

13. The method of claim 1, said metal being a Group VIII metal selected from Fe, Co and Ni.

14. The method of claim 1, wherein the metal oxide is integrally bonded to the limestone.

15. The method of claim 1, wherein the said limestone removes 30 percent more $SO_2$ than limestone without the metal oxide for the same combustion operation.

16. A method for desulfurization comprising:
   a. coating limestone with a metal salt;
   b. heating the coated limestone to convert the metal salt to the metal oxide; and
   c. absorping sulfurous oxide onto the metal oxide coated limestone.

17. The method of claim 16, wherein the metal oxide is present as 0.25 to 5 weight percent of the CaO.

18. The method of claim 17, said metal being iron and further comprising burning a sulfur bearing coal, giving off said sulfurous oxides, said burned coal leaving a coal ash residue containing iron oxide, and recycling the iron oxide of the coal ash for coating the limestone.

19. The method of claim 16, wherein the metal is iron.

20. The method of claim 19, wherein the sulfurous oxide emanates from the combustion of a sulfur-bearing coal.

21. The method of claim 20, wherein the heating and absorbing occur in a fluidized bed combustion.

22. A composition for the removal of sulfurous gases, said composition comprising particulates of limestone having a metal oxide coating thereon.

23. The composition of claim 22, said limestone being calcined.

24. The composition of claim 22, wherein the metal oxide is present as 0.25 to 10 weight percent of the CaO.

25. The composition of claim 22, wherein the metal oxide is present as 0.5 to 3.0 weight percent of the CaO.

26. The composition of claim 22, said metal oxide being formed in situ on the limestone.

27. The composition of claim 22, said particulates being porous.

28. The composition of claim 27, the majority of said pores having a diameter in the range of 0.2 to 0.4 microns.

29. The composition of claim 28, said particulates having a particle size range of $-16$ to $+20$ Tyler mesh.

30. The composition of claim 22, said metal being a transition metal.

31. The composition of claim 22, said metal being a Group VIII metal selected from Co, Fe, and Ni.

32. The composition of claim 22, said metal being iron.

33. The composition of claim 22, said metal oxide being integrally bonded to said limestone.

34. The composition of claim 22, said metal oxide being formed on the limestone by the decomposition of a metal salt adhering to the limestone.

35. The composition of claim 34, said salt being an iron salt.

36. The composition of claim 35, said iron salt being in aqueous solution.

37. A composition for the removal of sulfurous gases, said composition comprising particulates of limestone having an iron salt coating thereon.

38. The composition of claim 37, wherein said iron salt is present as 0.5 to 10 percent by weight of the limestone.

39. The composition of claim 38, wherein said iron salt is iron sulfate and/or iron sulfite.

* * * * *